April 16, 1963   J. C. ANSTROM ET AL   3,085,773
ADJUSTABLE ENGINE MOUNT
Filed Feb. 1, 1960
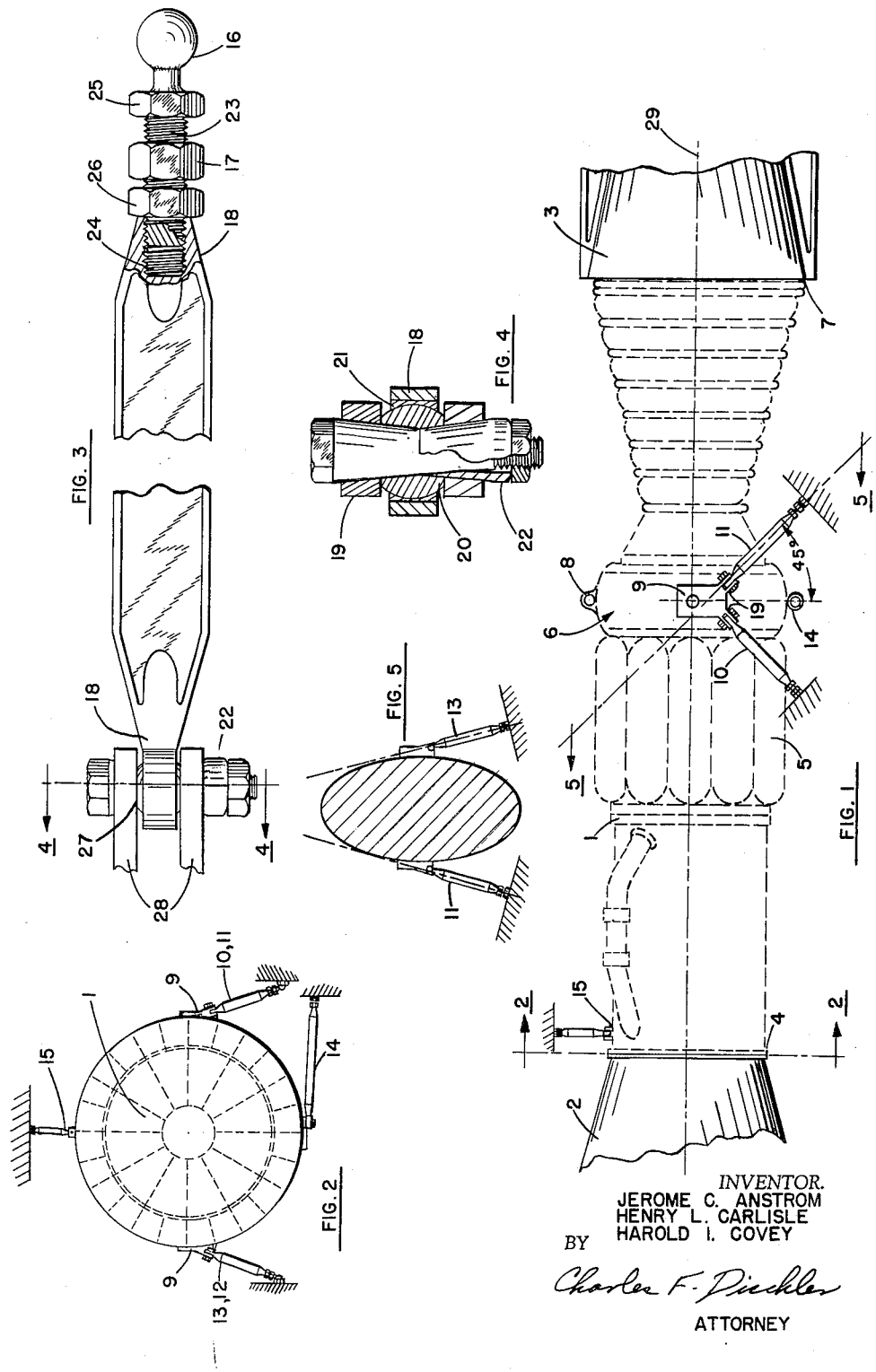
INVENTOR.
JEROME C. ANSTROM
HENRY L. CARLISLE
HAROLD I. COVEY
BY
Charles F. Diechler
ATTORNEY

United States Patent Office 3,085,773
Patented Apr. 16, 1963

1

3,085,773
ADJUSTABLE ENGINE MOUNT
Jerome C. Anstrom, Redondo Beach, Henry L. Carlisle, Inglewood, and Harold I. Covey, Hermosa Beach, Calif., assignors to North American Aviation, Inc.
Filed Feb. 1, 1960, Ser. No. 6,058
8 Claims. (Cl. 248—5)

This invention concerns link means for mounting a power plant in a vehicle whereby rapid and accurate adjustment of the power plant alignment in the vehicle may be accomplished, and the loads transferred between the engine and vehicle frame will impose a minimum amount of bending stress on the engine or air vehicle and a minimum displacement of the engine in relation to the air vehicle during deflection of the air vehicle structure. The invention has particular application to jet engines mounted in vehicles within the broad class including supersonic aircraft and space vehicles.

In vehicles within the stated class, efficient use of available power is of greater importance than with conventional high performance aircraft, since the penalties of size, weight and drag are greatly multiplied during space travel at extremely high speed. Use of power at maximum efficiency requires precise alignment of the mean line of engine thrust within very narrow limits, since the entire balance of forces around the aircraft center of gravity is extremely sensitive to slight directional variations of the said line during supersonic conditions. Therefore, it is a basic requirement in vehicles of the stated class that the engine mounting means be readily adjustable to position the engine securely and accurately in any given position within the necessary range of positions. To accomplish this, the engine mounts must be capable of fine or vernier type adjustments. Moreover, since inlet ducts are frequently required to furnish the airflow for compressors in jet engine powered aircraft, alignment of the compressor inlet with such ducts is necessary. Accordingly, the engine mounts should permit accurate adjustment of either end of the engine in an infinite number of positions within the necessary range. The problem of maintaining engine alignment with respect to the vehicle in which it is mounted is further complicated by the fact that a single ball joint on each side of the engine is commonly used for the main engine mount in the prior art. With this arrangement, very small lateral deflections of the fuselage structure can cause extreme variations in the mean line of engine thrust due to consequent lateral misalignment of the engine aft section. Since lateral deflections of the fuselage structure are frequently encountered due to aerodynamic loads imposed on the vehicle in which the engine is mounted, engine misalignment from this cause is commensurately disadvantageous. Accordingly, the engine mounts in vehicles of the stated class should minimize the effect of fuselage or vehicle structure deflection upon engine aligiment.

Also, supersonic vehicles, whether manned or not, are characterized by highly complex electronic and fully automatic systems for performing most of the guidance and control functions. Due to the increased criticality of the size and weight limitations in supersonic vehicles, the compactness and crowded internal conditions resulting from such equipment severely limit the accessibility of items requiring adjustment which may be situated deep within the vehicle. The engine mounts are typically so situated. Therefore, it is a further requirement in vehicles of the stated class that the engine mounts be readily adjustable by means adapted to function within the narrow confines of the engine compartment while the engine is installed therein.

2

Moreover, in both military and commercial vehicles of flight, the ease and rapidity with which changes and adjustments may be accomplished is of prime importance in consideration of the power plant configuration. Therefore, engine mounting means for use in such vehicles should require a minimum of personnel and a minimum of technical skill to produce the desired adjustment.

In addition to the above, higher stresses and temperatures incident to supersonic conditions impose further penalties on engine mounting structure. This is particularly true in the case of engines having turbines normally operating at high temperature, especially where the main engine supports are located near the engine center of gravity which commonly lies in the high temperature turbine section. Thus, in vehicles of the class mentioned, the engine mounts should effectively minimize the stress imposed upon the engine by loads transmitted from the surrounding vehicle structure. Similarly, vehicle structure in the high-temperature engine compartment is adversely affected by the concentration of heat, and the stresses on such structure should, therefore, be minimized by all possible means. Engine mounts for vehicles in the stated class should, therefore, transfer forces to the vehicle structure as tangential loads, permitting the greater part of the load to be taken in shear.

Accordingly, it is a principal object of the instant invention to provide engine mounting means which will permit accurate adjustability of the engine longitudinal axis in an infinite number of positions within a limited range.

It is a further object to provide engine mounting means which minimizes the stress on engine and air vehicle structures resulting from transmission of forces between the engine and the vehicle structure in which the engine is mounted.

It is a further object to provide engine mounting means which permits adjustment of either end of the engine in an infinite number of positions, within a limited range.

It is a further object to provide engine mounting structure which may be adjusted with maximum ease and with a minimum of specialized skill.

It is a further object to provide engine mounting means which will transmit forces from the engine to the supporting vehicle structure and from such structure to the engine tangentially with respect to both.

Other objects and advantages of the instant invention will become apparent upon a close reading of the following detailed description of an illustrative embodiment of the invention, reference being had to the drawings wherein:

FIGURE 1 shows the general arrangement of links whereby various of the objects stated above are achieved, FIGURE 2 shows the general arrangement of links looking aft from the plane of line 2—2 shown in FIGURE 1, FIGURE 3 shows the link construction in detail, FIGURE 4 shows a breakaway view partly in section taken generally along line 4—4 of FIGURE 3, and FIGURE 5 is a general view taken along the oblique cross-sectional plane of line 5—5 shown in FIGURE 1.

The engine mounting means disclosed herein comprises essentially six links or elongate connecting members between the engine and the fuselage structure. Referring to FIGURES 1 and 2, an engine 1 is shown situated between inlet air duct 2 and exhaust duct 3. Compressor inlet 4 is shown closely adjacent to inlet air duct 2, whereby air for the combustion process is conducted to burner section 5 and thereafter the combustion products pass through turbine section 6, engine exhaust outlet 7 and exhaust duct 3. Since the engine center of gravity is typically located in the area of the turbine section as shown in FIGURE 1, lifting lug 8 and main engine mounting pads 9 are shown in vertical alignment therewith.

The total weight of engine 1 is supported primarily by two main mounts located on either side of the engine. Each main mount consists of two links. Reference numerals 10 and 11 designate the forward and aft main engine mounting links on the port side, respectively, while 12 and 13 are the corresponding links on the starboard side. A lateral engine mounting link 14 is shown in vertical alignment with the engine center of gravity and a forward engine steady support is shown at 15. The links 10 to 15, inclusive, constitute the sole supporting connections between the engine and the fuselage.

Since the six links 10 to 15 inclusive, may be identical with the sole exception of their length, only one will be described in detail. A typical link as shown in FIGURES 3 and 4 may comprise a main link body 18 with ball end 16 at one end and ball element 20 at the other. Ball end 16 is secured to the end of a threaded shaft 23 which engages corresponding threads 24 in body 18. Jam nut 17 is mounted on shaft 23 in threaded engagement therewith. Ball end 16 may be moved relative to body 18 by rotating hexagonal surface 25, and locked in position by moving jam nut 17 against the flatted end 26 of body 18. Thus, it may be seen that shaft 23, jam nut 17, body 18 and the members adjoining thereto form an adjusting means which may be used to vary the overall length of the link member shown in FIGURE 3 and holding means to hold the length constant after such adjustment. With the link disconnected, ball element 20 is universally rotatable within bearing insert 21 which is secured within an opening in the left end of body 18 as shown in FIGURE 4. Stirrup 19 engages the opposite flatted surfaces 27 of ball element 20 and is formed by two flanges 28, while bolt assembly 22 passing through flanges 28 and ball element 20 holds these elements in continuous engagement. Bolt assembly 22 is of a conventional type comprising a tapered shank with a tapered bushing thereon, both tapers in contact with corresponding surfaces in an opening which eliminates clearance between the assembled parts. Six mounting stirrups such as shown at 19 are affixed to the engine to receive the ends of links 10 to 15, inclusive. Ball element 20 is thus held stationary by virtue of the clamping action of flanges 28, while bearing insert 21 and body 18 are freely rotatable in all directions about a point located in the center of ball element 20. Ball end 16 may be clamped by appropriate means, not shown, forming part of the fuselage structure. A conventional split clamp with a spherical socket would suffice, within which ball end 16 may be freely rotated while retained against any linear movement.

Main engine mounting pad 9 for links 10 and 11, and the mounting pads for all other links are secured to the engine to provide stirrups 19 which may be integrally joined to the pads in the manner of a one-piece casting. The mounting pads and stirrups connected to all the links except forward steady support 15 are positioned so as to result in tangential loading of the engine. This loading condition results when an elongate structural member such as a link is connected to a curved or tubular body so that the longitudinal axis of the link is tangent to the curve resulting from a cross-sectional plane through the body, this plane containing the link longitudinal axis. In the device herein disclosed, the longitudinal axes of aft links 11 and 13 both lie in a common plane, and each of these axes is substantially at an angle of 45° with respect to the vertical reference as shown by line 5—5 in FIGURE 1. Hence, plane 5—5 common to both aft links intersects the longitudinal axis 29 of the engine at an angle of 45°, and if the engine were perfectly round, the cross-section resulting from the intersection of the plane with the engine would be an ellipse, as generally indicated by FIGURE 5. The aft links 11 and 13 are connected between the engine and the fuselage so that the longitudinal axis of each aft link will lie substantially on a line tangent to the said ellipse. Similarly, the forward links 10 and 12 lie in a common plane with their longitudinal axes substantially on lines tangent to the engine cross-section resulting from intersection of the engine and the plane containing the stated axes. Link 14, as shown by FIGURE 2, is connected so that its longitudinal axis is substantially tangent to the engine cross-section resulting from a vertical plane taken through the point of attachment between link 14 and engine 1.

Thus it may be seen that tangential loading of the engine is accomplished by the arrangement of links 10 to 14, inclusive. This arrangement results in a minimum of stress on the engine structure occurring due to forces applied by links 10 to 14, inclusive, and is very beneficial since the engines or power plants in common use, particularly those having compressors or turbines, are typically tubular or cylindrical in general form, and the outer surface or shell of the engine is the structure to which engine external forces are most commonly applied.

The arrangement of links disclosed herein further results in an improved means for effecting minute variation in the direction of the engine longitudinal axis, both forwardly and rearwardly. Thus, for example, lengthening link 11 and shortening link 13 by the stated length adjusting means on each link would result in lateral movement of the engine aft section, and any minor changes in the vertical alignment of the engine aft section may be easily corrected, if necessary, by adjustment of forward steady support 15. The fact that the length adjusting means are situated at the lower end of links 10 to 13, inclusive, enhances the accessibility of the structure by means of which engine alignment may be adjusted.

Moreover, distortions of the fuselage structure will not produce critical misalignment of the engine 1 with respect to the inlet and exhaust ducts 2 and 3, respectively, with the links situated in the manner disclosed herein. With the main engine support links 10 to 13, inclusive, connected to the fuselage at an attachment point considerably below the midpoint, as shown by FIGURES 1 and 2, wide lateral deflections of the fuselage structure at the sides of the fuselage will obviously have considerably less effect on lateral alignment of the engine. Moreover, due to the ball joint connections of the mounting links which permit rotation of each link independently of the others, the engine will not be subjected to torsional loads resulting from deflection of the fuselage structure. Consequently, the engine mounts disclosed herein materially reduce the risk of undesirable changes in the clearances between the engine and adjacent structural components including inlet and exhaust ducts.

The description set forth above applies to only one embodiment of the inventive concept in this application. All deviations from the precise structural details set forth above which fall within the scope of the appended claims are included in this basic concept.

We claim:

1. Engine mounting means consisting of a plurality of freely movable universal joints and a plurality of elongate elements, each of said elongate elements having one of said universal joints at each end of said elongate elements connected and arranged so that each of said elongate elements is connected by one of said universal joints at one end to an engine and each of said elongate elements is further connected by one of said universal joints at the end opposite from said one end to engine supporting structure said elongate elements being connected with their longitudinal axes in non-parallel relationship and disposed about said engine to prevent movement of said engine in any direction relative to said supporting structure.

2. In an engine mounting system for rigidly connecting an engine to supporting structure to prevent movement of said engine relative thereto, said system consisting of a plurality of elements universally connected to the engine and to supporting structure which carries the weight of the engine, each of said elements including length adjusting means for varying the overall length of each of said elements and holding means for holding said length constant after said length is adjusted and means including a ball end forming a freely movable universal joint for universally connecting each of said elements to said engine and to said supporting structure whereby each of said elements has a separate universal joint at each end thereof, said elements being arranged and disposed about said engine to constitute means for rigidly supporting said engine and preventing movement of said engine in any direction relative to said supportnig structure.

3. In a mounting system for holding an engine securely within a supporting structure, a main engine mount consisting of two links connected between the engine and the structure, each of said links including means for a separate universal joint connection at each end and length adjusting means for varying the overall length of each of said links and holding means for holding said length constant after said length is adjusted, each link being connected by said separate universal joints to the engine with the ends of said links in close juxtaposition and the longitudinal axes of said links diverging downwardly toward their respective connections with the supporting structure.

4. The mounting system as set forth in claim 3 above, having the longitudinal axis of each said link lying substantially on a line tangent to the curvature of the engine outline in a cross-section taken on a plane through the engine, said plane containing said axis.

5. The mounting system set forth in claim 4 above, including in addition thereto a lateral engine support comprising an additional link connected to the engine for tangential loading thereof so as to restrain said engine from rotation about its longitudinal axis due to torque loads thereon.

6. The mounting system set forth in claim 5 above, including in addition thereto a forward engine steady support comprising an additional link connected to the engine so that the longitudinal axis of said additional link lies substantially in a vertical plane containing the longitudinal axis of said engine.

7. In a mounting system for supporting an engine in a vehicle by attachment of the engine to the vehicle frame, two main engine mounts comprising one mount on each side of said engine, each said mount comprising an elongate forward link and an elongate aft link, said forward and aft links each being separately attached to the engine at one end and to the vehicle at the other, said engine attachment locations being in close juxatposition and said vehicle attachment locations being separated so that said forward and aft links on each mount substantially simulate an inverted V, the longitudinal axes of said forward links on both mounts lying in a common plane, the longitudinal axes of said aft links on both mounts lying in a common plane, the longitudinal axis of each said forward link lying substantially on a line tangent to the curvature of the engine in a cross-section taken on the said plane containing both said forward link longitudinal axes, and the longitudinal axis of each said aft link lying substantially on a line tangent to the curvature of the engine in a cross-section taken on the said plane containing both said aft link longitudinal axes.

8. In a mounting system as set forth in claim 7 above, each of said forward and aft links including length adjusting means for varying the overall length of each of said elements and holding means for holding said length constant after said length is adjusted and further including means for a universal joint connection at each end.

References Cited in the file of this patent

UNITED STATES PATENTS

| | | |
|---|---|---|
| 1,584,053 | Wait | May 11, 1926 |
| 2,172,706 | Julien | Sept. 12, 1939 |
| 2,815,184 | Westphal | Dec. 3, 1957 |
| 2,936,978 | Lauck | May 17, 1960 |
| 2,949,268 | Eggers | Aug. 16, 1960 |